June 28, 1932.  S. ARONOFF  1,864,627
METER TESTING DEVICE
Filed April 3, 1929
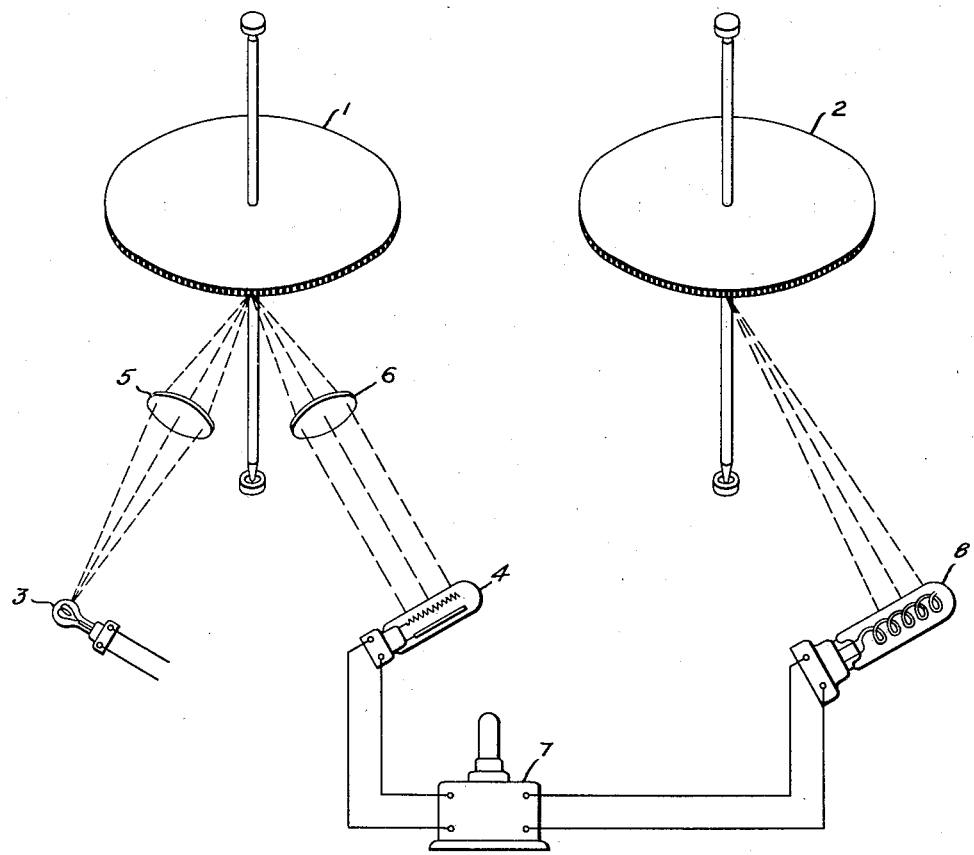
INVENTOR
*Samuel Aronoff.*
BY
ATTORNEY Patented June 28, 1932

1,864,627

UNITED STATES PATENT OFFICE

SAMUEL ARONOFF, OF NEWARK, NEW JERSEY, ASSIGNOR TO WESTINGHOUSE ELECTRIC & MANUFACTURING COMPANY, A CORPORATION OF PENNSYLVANIA

METER TESTING DEVICE

Application filed April 3, 1929. Serial No. 352,140.

My invention relates to meter-testing devices and more particularly to testing devices for modern watthour meters having rotating-disc armatures.

My invention has for an object to provide a method of and means for quickly and accurately synchronizing the rotating element of a test watthour meter with the rotating element of a standard watthour meter in such manner that no load is placed on either of said rotating elements.

Briefly speaking, my invention comprises generating electric impulses in accordance with the speed of the rotating element of the standard watthour meter by means of a photoelectric cell and a light beam coacting with said element and intermittently lighting a neon lamp that is placed near the stroboscopically marked disc of the test meter in accordance with said electric impulses.

My invention may be more readily understood, however, if the accompanying drawing is referred to in connection with the following description:

The single figure of the accompanying drawing is a diagrammatic representation of my apparatus for stroboscopically comparing the speeds of two rotating elements.

In the drawing, the rotating element 1 of a standard watthour meter and the rotating element 2 of the test watthour meter are respectively actuated in accordance with their electromagnets (not shown) which may be connected to measure the same load.

As illustrated in the drawing, the periphery of each disc is provided with a series of equally-spaced light-absorbing and light-reflecting surfaces of preferably the same number.

A source of light 3, such as a modern incandescent lamp, is positioned to throw a beam of light on the periphery of the disc 1 of a standard watthour meter. A photo-electric cell 4 is so positioned that the beam of light from the lamp 3 to the periphery of the disc 1 is projected on it every time a light-reflecting segment on the periphery of the disc 1 presents itself. Light-converging-and-dispersing lenses 5 and 6 may be provided, respectively, in the path of light from the lamp to the periphery of the disc 1, and in the path of the projected light from the periphery of the disc 1 to the photo-electric cell 4, to insure the positive operation of the latter.

As the disc 1 rotates, the light-absorbing and the light-reflecting portions of the surface of its periphery alternately pass the focal point of the lens 5 and, hence, alternately absorb and reflect the light flux emanating from the lamp 3. Such alternative reflection and absorbence of the light produces an intermittent lighting of the photo-electric cell 4 which is proportional to the speed of rotation of the disc 1. The photo-electric cell 4, in turn, generates electric-current impulses that are proportional in number to the speed of rotation of the disc 1.

The pulsating current produced by the photo-electric cell 4 may be so amplified by means of any suitable amplifying unit, as, for example, a three-electrode vacuum-tube amplifier 7 as to be of sufficient strength to energize a neon lamp 8. I prefer to use a neon lamp in this connection because the character and quality of the rays produced thereby are especially suitable for stroboscopic purposes.

The neon lamp 8 is preferably so positioned with respect to the disc 2 of the test watthour meter that the stroboscopic action between the intermittent light of the lamp 8 and the light-absorbing and light-reflecting portions on the periphery of the disc 2 may be readily absorbed.

Since the frequency of the light pulsations of the neon lamp 8 is proportional to the speed of rotation of the disc 1 of the standard watthour meter, a stroboscopic synchronism may be established between the disc 2 and the neon lamp 8 by virtue of which the speed of the disc 2 may be made exactly equal to that of the disc 1 or, as it is commonly termed, the two discs may be synchronized.

I consider my method to be a great improvement in prior methods of watthour-meter testing in that the time element necessary for test purposes is greatly reduced, and elimination is made of the need for calibration by trial for any particular number of revolutions.

While I have disclosed my invention as particularly applicable for use in connection with the testing of watthour meters, it will be understood that it is useful in connection with synchronizing corresponding parts of a rotating machine.

I claim as my invention:

1. In combination, a plurality of rotating discs having equi-spaced alternate light-absorbing and light-reflecting surfaces around their peripheries, means for stroboscopically comparing the speeds of said discs comprising a neon lamp for coaction with one of said discs, a photo-electric cell, a source of light coacting with said light reflecting surfaces of another of said discs, for intermittently creating impulses in said photo-electric cell, and means including an electronic relay for amplifying said impulses to energize and de-energize said neon lamp in accordance with the speed of said last-mentioned disc.

2. In combination, a movable element having alternate light-transmitting and light-retarding areas of predetermined length along a path of movement thereof, a light-sensitive device for generating electrical impulses, means for directing light toward said device through the intermediary of said areas to cause said impulses, a second movable element having alternate light-absorbing and light-reflecting surfaces along a path of movement thereof, a luminous electrical discharge device for illuminating said second element, and means including an electronic relay for amplifying said impulses to energize and deenergize said discharge device.

3. In combination, a movable element having alternate light-reflecting and light-absorbing areas of predetermined length along a path of movement thereof, a light-sensitive device for generating electrical impulses, means for directing angularly-related beams of light, respectively, toward said areas and from said areas to said device, a second movable element having alternate light-absorbing and light-reflecting surfaces along a path of movement thereof, a luminous electrical discharge device for illuminating said second element, and means for amplifying said impulses to energize and deenergize said discharge device.

4. In combination, a movable element having alternate light-reflecting and light-absorbing areas of predetermined length along a path of movement thereof, a light-sensitive device for generating electrical impulses, means for directing angularly-related beams of light, respectively, toward said areas and from said areas to said device, a second movable element having alternate light-absorbing and light-reflecting surfaces along a path of movement thereof, a luminous electrical discharge device for illuminating said second element, and means for amplifying said impulses to energize and deenergize said discharge device, a condensing lens in the path of said first beam, and a diffusing lens in the path of said second beam.

In testimony whereof, I have hereunto subscribed my name this 9th day of March, 1929.

SAMUEL ARONOFF.